Aug. 10, 1965   J. P. ECKERT, JR., ET AL   3,200,390
VOLTAGE MONITORING CIRCUIT
Filed Dec. 20, 1960   2 Sheets-Sheet 1

INVENTORS
JOHN PRESPER ECKERT, JR.
HERMAN LUKOFF
NACHUM PORATH

P. Donald Weber Jr.
AGENT

Aug. 10, 1965    J. P. ECKERT, JR., ETAL    3,200,390
VOLTAGE MONITORING CIRCUIT

Filed Dec. 20, 1960                          2 Sheets-Sheet 2

INVENTORS
JOHN PRESPER ECKERT, JR.
HERMAN LUKOFF
NACHUM PORATH

J. Donald Weber
AGENT

United States Patent Office 3,200,390
Patented Aug. 10, 1965

3,200,390
VOLTAGE MONITORING CIRCUIT
John Presper Eckert, Jr., Gladwyne, and Herman Lukoff, Philadelphia, Pa., and Nachum Porath, Tel-Aviv, Israel, assignors to Sperry Rand Corporation, New York, N.Y., a corporation of Delaware
Filed Dec. 20, 1960, Ser. No. 77,156
3 Claims. (Cl. 340—248)

This invention relates to monitoring circuits and more specifically the invention relates to circuits which compare a monitored voltage with a reference voltage and indicate the presence of undesirable variations in the monitored voltage.

Thus, there is provided a system for monitoring voltages according to this invention in which a D.C. voltage to be monitored is compared to upper and lower tolerance-limit D.C. voltages via unilateral conducting devices. In addition, a relatively small-signal source of potential connected to an alarm circuit, is connected across the unilateral devices such that the unilateral devices act as switches in an A.C. circuit. Thus, when there is no voltage drop across the unilateral conductors the unilateral conductors are non-conductive and the small A.C. signal is not passed therethrough whereby there is no current flow in the A.C. circuit. However, when there is a forward D.C. voltage drop across the unilateral conductors, the unilateral conductors conduct and current flows through the A.C. circuit. A signal is then transmitted to the alarm circuit via an amplifier and the unbalance of voltage (across the unilateral conductor) between the monitored voltage and the reference voltage is immediately indicated.

Accordingly, one object of this invention is to provide a circuit which produces an aural or visual indication of an undesirable variation of a monitored voltage.

Another object of the invention is to provide a simple circuit which gives an indication when a monitored voltage is either too high or too low.

A further object of the invention is to provide a monitoring circuit which directly and continuously samples the voltage to be monitored.

Yet another object of the invention is to provide a voltage monitoring circuit which has narrow tolerances.

Another object of the invention is to provide a network capable of monitoring one or more different voltages and indicating variations therein on a single alarm device.

Still another object of the invention is to provide a monitoring circuit having high reliability and few components.

These and other objects and advantages of the invention will become clear and the principles of the invention will be more readily apparent when the following description is read in conjunction with the attached drawings, in which.

Figure 1:
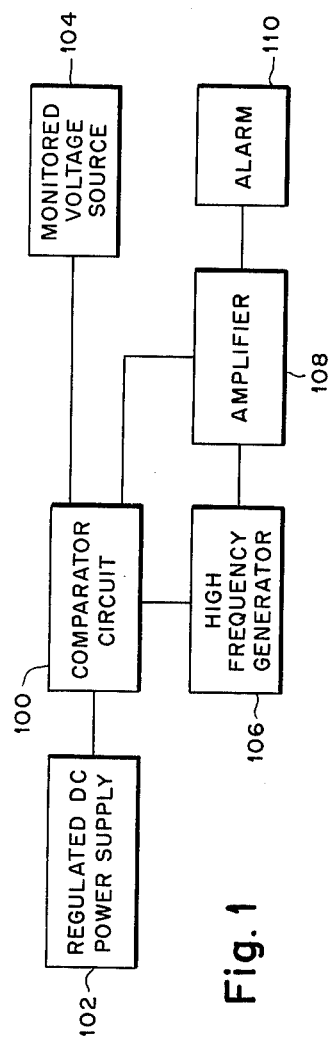
FIGURE 1 is a block diagram of the monitoring circuit which comprises the invention.

Referring now to FIGURE 1, there is shown a Comparator circuit 100 which is connected between a regulated D.C. power supply 102 and a monitored-voltage source 104. In addition, the Comparator circuit 100 is connected in an A.C. series circuit comprising a suitable A.C. small signal generator 106 and an amplifier circuit 108. The amplifier circuit is further connected to an alarm circuit 110.

Figure 2:
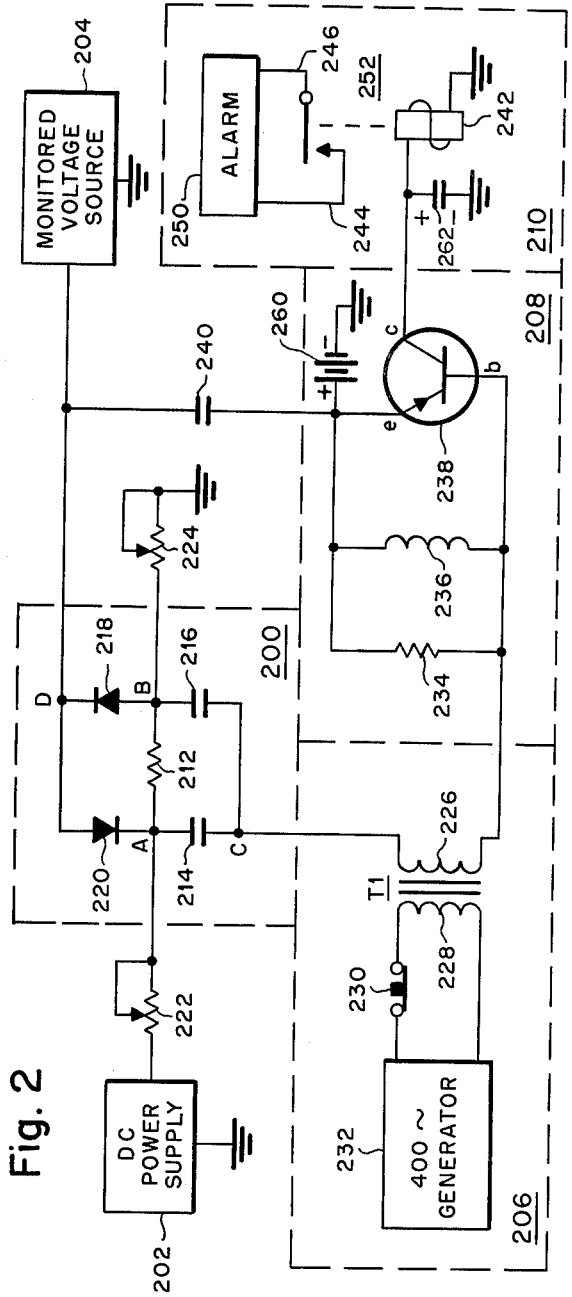
FIGURE 2 is a schematic diagram of one embodiment of the monitoring circuit shown in FIGURE 1.

As will be appreciated from a more detailed description of FIGURE 2, the Comparator circuit 100 acts as a switch in the A.C. circuit of generator 106 and amplifier 108. This switch-like action of the Comparator circuit is controlled by the relative potentials supplied by the D.C. power supply 102 and the monitored source 104. That is, if these potentials are the same (or within specified tolerances) the Comparator circuit acts as an open switch in the A.C. circuit. Conversely, if these potentials are not within the specified tolerances of each other, the Comparator circuit acts as a closed switch in the A.C. circuit. This switching action of the Comparator 100, of course, controls the current flow through the A.C. series circuit. That is, when the Comparator circuit 100 acts as a closed switch a large current flows through the A.C. circuit and when Comparator circuit 100 acts as an open switch no current flows through the A.C. circuit (assuming ideal components). Moreover, the alarm circuit 110 is controlled by the amount of current flowing through the A.C. series circuit. For example, if the A.C. circuit has a large current (or in the alternative a small current) therein, the alarm device will provide an indication—aural or visual—thereof.

It is seen, therefore, that the alarm indication is ultimately controlled by the relative potentials of the monitored source 104 and the D.C. power supply 102. Thus, when the alarm device is indicative of a particular current condition in the A.C. circuit, it is also indicative of a particular relation between the potentials supplied by the sources 102 and 104. Since the reference potential of source 102 is predetermined, the alarm device is effectively indicative of the potential supplied by source 104.

In referring to FIGURE 2, a more detailed description of the operation of the monitoring circuit may now be presented. The circuit shown within the dotted outline 200 is a more detailed illustration of Comparator circuit 100 (FIG. 1). Comparator circuit 200 comprises a voltage dropping resistor 212; filter capacitors 214 and 216; and diodes 218 and 220. Resistor 212 has a first one of its ends connected to one element of capacitor 214. The other element of capacitor 214 is connected to one element of capacitor 216, which capacitor 216 then has its other element connected to a second one of the ends of resistor 212. The second end of resistor 212 is further connected to one electrode (for example, the anode) of a unilateral conductor 218, for example a diode. The other electrode (cathode) of the unilateral conductor 218 is connected to one electrode (for example, the anode) of another unilateral conductor 220, for example a diode, which unilateral conductor 220 has its other electrode connected back to the first end of resistor 212. Thus, the Comparator circuit 200 may be analogized to a bridge network wherein the unilateral conductors 218 and 220 are connected head to tail and the capacitors 214 and 216 are connected end-to-end. Moreover, each of the capacitors and each of the unilateral conductors comprise one of the branches of the bridge network. Resistor 212, therefore, may be considered to be connected between two nodes (nodes A and B) of the bridge network with the first and second ends of the resistor representing these two nodes respectively and to provide a potential dropping means between the two nodes; and the other two nodes (nodes C and D) may be considered to be represented by the common connection of elements of capacitors 214 and 216 and the common connection of the electrodes of unilateral conductors 218 and 220, respectively.

Node A of the Comparator-bridge circuit 200 is connected to a regulated D.C. power supply 202 via variable resistor 222. Node B of the Comparator-bridge circuit 200 is returned to ground via variable resistor 224. Thus, the D.C. reference potential source is applied across the Comparator-bridge circuit 200 between nodes A and B.

The small signal A.C. series circuit is similarly applied across the Comparator-bridge circuit 200. In a preferred embodiment the A.C. circuit is connected between nodes C and D of Comparator 200. That is, node C is connected to node D via the A.C. generator 206, amplifier 208 and capacitor 240. More particularly, node C is connected to one terminal of coil 226. This coil is a secondary winding of transformer $T_1$ which links the A.C. circuit to an A.C. signal generator 232 via the primary winding 228 of transformer $T_1$ and normally closed switch 230. The generator 232 may be, for example, a 400 c.p.s. generator which provides an output signal on the order of one or two volts. In any event, generator 232 may be a high frequency, small signal generator. Moreover, transformer $T_1$ may be a 1 to 1 transformer so that the A.C. signal in the A.C. series circuit is also on the order of one or two volts. It is to be understood that this signal magnitude may be altered without departing from the basic inventive concept.

Another terminal of coil 226 is connected directly to the amplifier. Particularly, in the preferred embodiment, the coil 226 is connected to the base $b$ of transistor 238. In addition, this same coil terminal may be connected to the emitter $e$ of transistor 238 via the parallel combination of resistor 234 and inductor coil 236. The parallel combination thereby provides a frequency responsive potential-dropping network which may be utilized to control the operability of the transistor amplifier. The emitter $e$ of transistor 238 is connected to one element of capacitor 240, the other element of which is connected to node D of the Comparator-bridge circuit 200.

Moreover, node D of the Comparator-bridge circuit is also connected to the source 204 which is to be monitored. The voltage source 204 may be any type of voltage source which provides a voltage to any system and, more particularly, a source which is to provide a voltage within certain prescribed limits. One example of such a device is a power supply for use with a high speed business machine or computer.

Returning to transistor 238, it should be noted that the collector $c$ is connected to one terminal of a relay coil 242, the other end of which may be returned to ground potential. The relay contacts 244 and 246 are connected to an alarm device 250 such that the alarm device may be operated by the actuation of the relay which results in the motion of armature contact 246. Thus, it is contemplated that the alarm device may be rendered operative either by the making or breaking of contact by armature contact 246. However, a preferred embodiment is illustrated which utilizes an alarm device 250 which is actuated by the armature 246 making contact with contact 244.

In operation, the circuit shown in FIGURE 2 monitors the voltage supplied by source 204 and indicates, by means of alarm circuit 210, whenever this monitored voltage falls outside of prescribed tolerances. This operation is achieved by providing an accurate regulated D.C. voltage as a reference voltage. The source 202 provides this reference voltage. The resistors 222 and 224 are connected to the source 202 such that the D.C. voltage supplied to nodes A and B may be varied and controlled accurately. That is resistors 222, 224 and 212 comprise a voltage divider network and the voltages at nodes A and B may be varied by varying the resistors 222 and 224. Therefore, these variable resistors function as voltage limiting resistors and provide the necessary control over the reference potentials applied at nodes A and B. Since the voltages must be accurately determined, the resistors in the voltage divider network preferably are precision resistors (1% tolerance).

The voltage to be monitored is supplied by source 204. This voltage is applied to the Comparator-bridge circuit 200 at node D, which is the common connection of the unilateral conductors 218 and 220. These conductors are preferably diodes having steep forward conducting characteristics, i.e. large current changes for small voltage changes (see FIGURE 3). Typical ones of such diodes are silicon diodes IN 645, IN 646, IN 647, etc. manufactured by Rheem Semi-Conductor Corp., for example. There are other diodes which will fill these requirements, but further illustrations become unnecessary. These diodes are arranged such that the anode of one and the cathode of the other diode are connected to the source 204 in head to tail relation. For example, as shown, diode 218 has its anode returned to ground via reference node B and resistor 224, and its cathode connected, via node D, to the monitored-voltage source 204. Conversely, diode 220 has its cathode connected to D.C. source 202 via reference node A and resistor 222, and its anode connected, via node D, to the monitored-voltage source 204. Thus, the conduction or not of diodes 218 and 220 is dependent upon the voltage applied at nodes A and B by source 202 and the voltage applied at node D by source 204. Thus, in an ideal case, if the reference voltage at node B is chosen to be +27 volts, diode 218 will conduct whenever the monitored-voltage applied at node D falls below +27 volts. Similarly, if the reference voltage at node A is chosen to be +29 volts, the diode 220 will conduct whenever the monitored-voltage applied at node D by source 204 arises above +29 volts.

Since the diodes 218 and 220 are not ideal and have a forward voltage drop, this voltage drop must be taken into consideration in practical applications. However, it is now possible to obtain diodes, such as those described above, which have forward voltage drops on the order of 0.5 to 1.0 volt (within the current ranges necessary for the instant invention). Thus, the diodes 218 and 220 may be made to conduct with a very small voltage thereacross and thereby define quite sharply a prescribed tolerance range.

Summarizing then, the monitored-voltage supplied by source 204 is assigned a predetermined voltage range with high and low-level tolerances, within which this monitored-voltage must reside. The tolerances are set by the application of D.C. reference voltages at the nodes A and B by source 202. Whenever the monitored voltage drifts beyond the prescribed range, one or the other of the diodes 218 and 220 will conduct. That this type of operation provides a switching action in the A.C. circuit will be seen from the following description.

The A.C. circuit comprising blocking capacitor 240, generator 206 (similar to 106, FIGURE 1) and amplifier 208 (similar to 108, FIGURE 1) is connected across nodes C and D of the Comparator-bridge circuit 200. As noted previously, coil 226, connected between node C and base $b$ of transistor 238, is the secondary winding of transformer $T_1$ which is connected to 400 c.p.s. generator 232. Thus, since switch 230, which is shown as a push button but which may be a relay or other similar device, is normally closed, a 400 c.p.s. signal is applied to primary winding 228. This signal which is on the order of 1 or 2 volts is induced, by normal transformer action, in winding 226 and provides a signal of similar magnitude in winding 226. However, if ideal diodes are again assumed, there is no complete A.C. circuit for this signal if both diodes 218 and 220 are biased off. Practically, however, an extremely small (on the order of a small fraction of a volt) half-wave rectified voltage will be passed by each diode. Thus, there will be a small signal flowing through the circuit comprising winding 226, Comparator-bridge circuit 200, capacitor 240 and winding 236. This signal will be extremely small and very low frequency (nearly D.C.) so that the impedance of winding 236 is less than the impedance of resistor 234, and, in fact, is very nearly a direct short. Moreover, since the signal is so small and since the impedance of the winding is negligible, the potential difference between emitter $e$ and base $b$ of transistor 238 is extremely small and the transistor 238 remains cut off. That is, because of the forward voltage drop across the transistor (between emitter $e$ and base $b$) transistor 238 is initially cut off because the potentials at the base and emitter are substantially the same. In addition, a bias potential source 260 may be connected to the transistor in order to overcome any spurious voltage produced in the A.C. circuit. In view of the transistor's cut off state, there is negligible current flow through winding 242 whereby the relay is not activated and alarm device 250 remains inactive.

If it is now assumed that one of diodes 218 and 220 is conducting, (that is, for example, the monitored-voltage from source 204 is outside of the prescribed tolerance limits,) a complete A.C. circuit is now presented so that the aforementioned signal induced in winding 226 flows through capacitor 216 (which may be, for example, on the order of 1 mfd. to present low A.C. impedance), through the conductive diode 218 (or 220), through capacitor 240 (similarly, approximately 1 mfd. to present low A.C. impedance but substantially infinite impedance to the D.C. voltage from source 104), and through resistor 234 back to winding 226. The winding 236 is chosen so that although its D.C. impedance is small, at 400 c.p.s. its A.C. impedance is much higher than that of resistor 224. Also, substantially all of the A.C. signal (on the order of one or two volts) is passed by the conducting diode so that the potential difference between emitter $e$ and base $b$ of transistor 238 is sufficient to cause the transistor to turn on. This operation may be provided, as indicated, by proper selection of the circuit components 234 and 236.

When the transistor 238 is now turned on, a relatively large current flows from the transistor through winding 242 and the relay 252 is activated. That is, armature contactor 246 is moved into (or out of) contact with contactor 244 and the alarm device 250 is activated. For example, if the relay 252 is normally open as shown in a preferred embodiment of FIGURE 2, the energization of winding 242 will cause the contactors 244 and 246 to close and complete the alarm device circuit. This may result in a buzzer or bell sounding, or alternatively, a light flashing on and/or off. In the event that greater current is required to activate alarm device 250 than may be safely handled by transistor 238, another transistor may be placed in "piggy-back" arrangement in order to provide the large current necessary.

Summarizing the operation of the A.C. circuit, an alarm device 250 may be activated if a large current passes through a winding 242 thereby energizing a relay 252. Conversely, the alarm device 250 is not activated in the absence of a large current through the winding. The magnitude of the current passing through the winding 242 is controlled by transistor 238. That is, when the transistor is "on" a large current flows, and when the transistor is "off," a negligible current flows. Moreover, the state of the transistor is controlled by the magnitude of the A.C. current applied to the potential difference network (resistor 234 and winding 236). This current magnitude is controled by the switching action of comparator bridge circuit 200 as noted previously.

Thus, it may be seen that, ultimately, the activation or not of the alarm device 250 is controlled by the level of the voltage applied by the monitored-voltage source 204 to the comparator-bridge circuit 200. Clearly, if the monitored-voltage lies within the tolerances of the voltage range prescribed by the reference source 202 and the voltage divider comprising resistors 212, 222, and 224, the diodes 218 and 220 will be non-conductive and there will be no current flow through the A.C. series circuit. So long as no current flows through the A.C. circuit, transistor 238 is cut off, and as noted above, the alarm device 250 is not activated.

As was noted previously, the D.C. power supply, reference voltage source 202 need not be returned to ground through variable resistor 224, but rather the source 202 may be center-tapped with resistor 224 being returned to another terminal of source 202 whereby there is provided a reference voltage source which supplies both positive and negative reference voltages. This arrangement may be necessary or desirable in some systems as, for example the system shown and described subsequently in conjunction with FIGURE 4.

The switch 230, of FIGURE 2, was described as being normally closed. This switch has a number of functions when placed in the location shown. For example, it may be necessary to periodically change the reference voltage levels, and in order to prevent a spurious indication by the alarm device 250, the switch 230, for example, a push button, may be opened and the A.C. circuit is clearly broken. It is obvious that this switch could take various forms or could be eliminated altogether; however, a preferred arrangement includes the switch for convenience.

Figure 3:
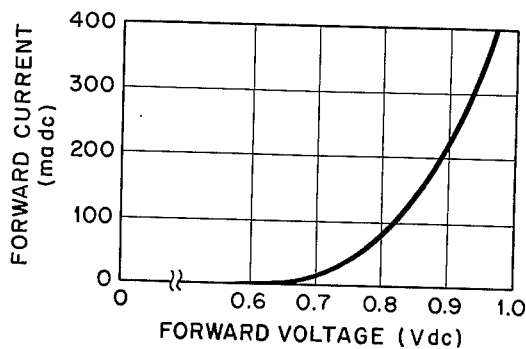
FIGURE 3 is a characteristic curve of a typical diode used in the Comparator circuit shown in FIGURES 1 and 2.

FIGURE 3, shows a characteristic curve for a typical diode used in the invention. The diodes previously noted, i.e. diodes IN645, IN646, etc. all have similar characteristic curves. This curve shows the forward current in milliamperes (D.C.) as a function of the forward voltage in volts (D.C.). It will be seen that a relatively small change in forward voltage drop across the diode may produce a relatively large forward current through the diode. This is advantageous in that a diode having such a steep slope characteristic will provide a better and sharper switching action. For example, when the voltage across the diode is approximately 0.7 volt there is a small forward current through the diode. However, when the forward voltage is about 0.8 volt, a current 4 or 5 times as large, flows through the diode. This type of diode operation provides a rather sharp switching action for the A.C. circuit used in the invention. Thus, the comparator-bridge circuit 200 (FIGURE 2) may monitor the voltage supplied by source 204 within a relatively small range. For example, a range having tolerances of ±0.8 volt is well within the limitations of the circuit. Clearly, if steep slope diode, other than those suggested, are used, larger or smaller tolerance ranges may be obtained. At present, the suggested diodes provide the most practical range limits.

Figure 4:
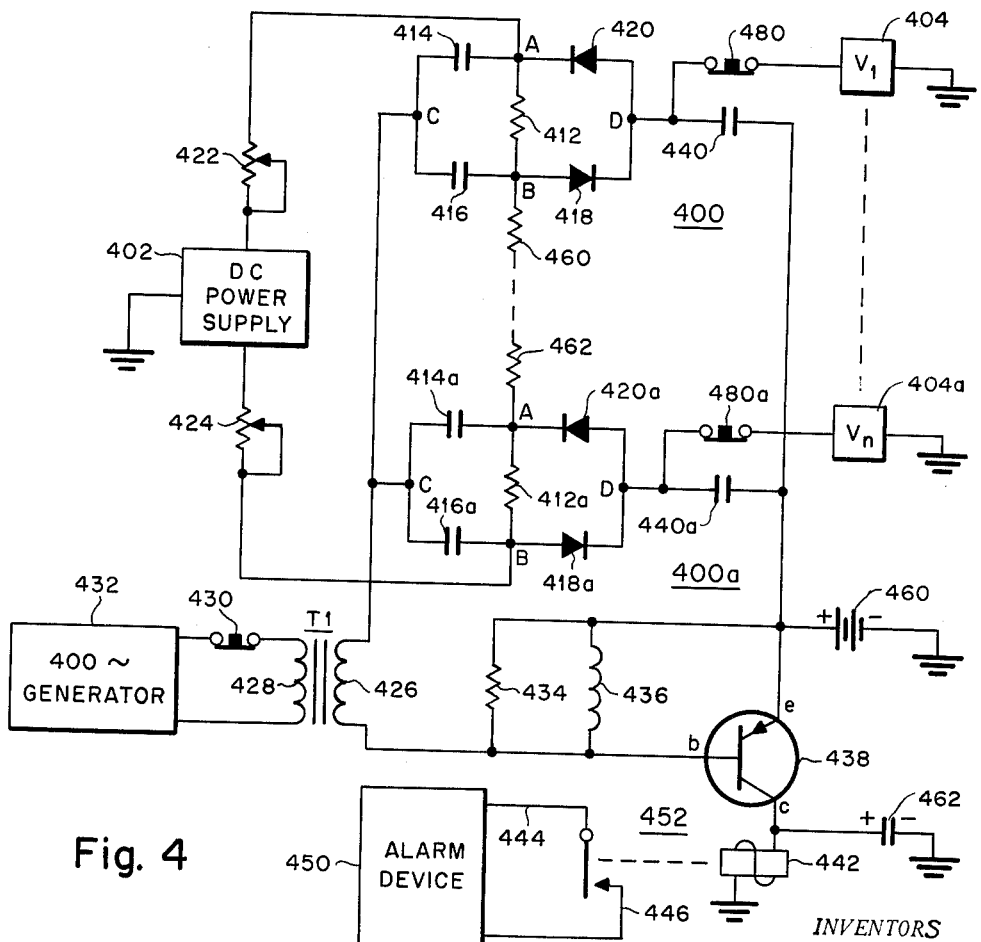
FIGURE 4 is a schematic diagram of another embodiment of the invention which may be used for monitoring a plurality of voltages.

Referring now to FIGURE 4, there is shown another embodiment of the invention. This embodiment of the invention is an extension of the same principle described in conjunction with FIGURE 2. Therefore, similar components in the two figures will be designated by reference numerals having the same last two digits. In this embodiment, a plurality of separate voltage sources may be monitored. There are shown only two sources, viz. sources 404 and 404a; however, it is to be understood that these sources represent as many sources as it may bed esirable to monitor. (This is symbolically shown by referring to the several voltages as $V_1$, $V_n$.)

The embodiment of FIGURE 4 is similar to that of FIGURE 2 in that a reference potential source 402 is connected across a voltage divider network whereby different reference voltages are applied at two nodes (A and B) of a plurality of comparator-bridge circuits 400, 400a, etc., for comparison with the voltages supplied by source 404, 404a etc. Moreover, an A.C. series circuit similar to that shown and described by FIGURE 2 and comprising transistor 438 (and the related inductor 436 and resistor 434) and generator 432 (and the related transformer $T_1$) is connected across the other two nodes (C and D) of each and every comparator-bridge circuit 400, 400a, etc. via whichever D.C. blocking capacitor 440, 440a, etc. is associated with the particular comparator-bridge circuit.

The operation of the circuit shown in FIGURE 4 is similar to the operation described in conjunction with FIGURE 2. Thus, by usual voltage divider principles, a reference voltage is applied to each node A and each node B of every comparator-bridge circuit 400, 400a, etc., involved. It should be clear from the previous description, that these reference voltages may be either all positive, all negative, or a combination of positive and negative voltages according to the manner of connection of source 402. As shown in FIGURE 4 source 402 is center-tapped; thereby providing, for example, a negative voltages at the lower end of the voltage divider (resistor 412a) and also providing positive voltages at the upper end of the voltage divider network (resistor 412). It is to be understood, that, in addition to the connection of source 402, the sense of polarity of the various reference voltages is also dependent upon the resistance values of the various resistors. However, for purposes of explanation, it is assumed that these resistances are of the same order of magnitude so that the reference voltages are substantially symmetrical relative to the voltage divider network.

As explained previously, the various reference voltages of the voltage divider network are compared with the various voltages to be monitored. That is, these reference voltages (supplied by source 402) cause the diodes (for example, diodes 418 and 420) of the several comparator circuits to be back-biased if the monitored-voltages (supplied by sources 404, etc.) are within the proper voltage range tolerances. For example, assume that source 404 is properly to have a voltage level of +28 volts and the tolerance limits are ±1.0 volt. Then nodes A and B of comparator-circuit 400 may have +29 volts and +27 volts impressed thereon, respectively. So long as the voltage supplied by source 404 stays between the limits of +29 and +27 volts, the diodes 420 and 418 remain back-biased and cutoff. Therefore, there is no current flow in the A.C. circuit, and the alarm device 450 is not activated.

If, however, the voltage level of source 404 exceeds the limits given (i.e. rises above +29 volts of falls below +27 volts) one of the diodes 418 and 420 will be turned on thereby completing the A.C. series circuit. Then, as before in FIGURE 2, the signal induced in the secondary winding 426 (of transistor $T_1$) by generator 432 via the primary winding 428 of the transformer, passes through capacitor 414 or 416, diode 418 or 420, capacitor 440, resistor 434 (and inductor 436). Since there is now produced a relatively large voltage drop between the base $b$ and emitter $e$ of transistor 38, the transistor is turned on. A relatively large current flows through the transistor and the relay coil 442 whereby the relay 452 is activated and the alarm device 450 is energized to indicate the undesirable drifting of the monitored-voltage beyond the prescribed limits.

Similarly, if source 404a is properly to have a voltage output level of −11.5 volts and the tolerance limits are ±0.8 volt, the voltages at nodes A and B of comparator circuit 400a may be −10.7 and −12.3 volts respectively. Again, if the voltage supplied by source 404a remains within the prescribed range, there is no substantial current in the A.C. series circuit. (The small rectified signal current is ignored as being negligible.) Therefore, the alarm device 450 is quiescent. Again if the monitored-voltage rises above or falls below the limits set, the A.C. circuit conducts and the alarm circuit is activated so to indicate.

It should be noted that although the illustrations have suggested symmetrical tolerances, (viz. +28=±1.0 volts and −11.5=±0.8 volts). This symmetry is not required by the invention. Thus, if it is desirable for some purposes to limit the range to closer low-level (or high-level) tolerances, this manner of operation is contemplated by the instant invention. For example, the voltage supplied by source 404 may be desired to be +28 volts and the reference voltages may be +30 and +27 volts or the like.

The switches 480, 480a, etc. are connected between the associated comparator-bridge circuits and monitored-voltage sources. These switches are not necessary but are shown as a preferred embodiment of the invention. As will be readily appreciated, the alarm device 450 will be activated by the undesirable drifting of any sources 404, 404a, etc. Therefore, it is necessary to provide simple means for determining which of these sources is defective. This simple detecting means is provided by swtiches 480, 480a, etc. Thus, when the alarm device 450 is activated, switch 480 (illustratively shown as a push button) may be opened. If source 404 was the defective source supplying the improper voltage, the alarm device will become inactive. That is, the forward biasing voltage will be removed from comparator circuit 400 and diodes 418 and 420 will no longer pass the A.C. signal in the A.C. series circuit.

If, however, the improper voltage was supplied by source 404a, opening switch 480 will not prevent the completion of the A.C. series circuit by a forward biased diode, (e.g. diode 418a or 420a) and alarm device 450 remains activated. The operator of the circuit then closes switch 480 and opens 480a. Clearly by following this procedure, the A.C. series circuit will eventually be broken and the alarm device deactivated. When the alarm device is deactivated, the defective voltage source is determined.

While there have been shown, described and pointed out the fundamental features of the invention as applied to preferred embodiments, it will be understood that various omissions, substitutions and changes in the form and details of the device illustrated and in its operation may be made by those skilled in the art, without departing from the principles of the invention.

Having thus described the invention, what is claimed is:

1. A system for checking the output voltage levels of a plurality of voltage sources, said system comprising a regulated voltage source for producing an accurately defined voltage, voltage divider means connected across said regulated voltage source thereby to provide a different reference voltage level at each of the terminals of said voltage divider means, means for comparing the voltage levels at said voltage divider terminals with the output voltage levels of said plurality of voltage sources to be checked, said comparing means including at least two oppositely poled unilateral conductor means each connected to a different one of said voltage divider terminals and having a single common junction therebetween, said single common junction being adapted to receive said output voltage levels to be checked, said unilateral conductor means being normally reverse biased when the voltage level applied to said common junction to be checked falls between the voltage levels at the two associated voltage divider terminals, one of said unilateral conductors being forward biased when the voltage level to be checked does not fall between the voltage levels at the two associated voltage divider terminals, an A.C. circuit for supplying relatively high frequency signals, said A.C. circuit coupled in series with said comparing means, said A.C. circuit being disabled when all of said unilateral conductor means are reverse biased and being enabled when any one of said unilateral conductors is forward biased, and indicating means which are rendered operative only when said A.C. circuit is enabled.

2. The system recited in claim 1 wherein said voltage divider means comprises a plurality of series connected resistors, each of said unilateral conductor means comprises a rectifier diode, and each of said comparing means comprises a pair of oppositely poled rectifier diodes with a common junction therebetween which common junction is connected to a separate voltage source.

3. In a circuit for indicating voltage levels, a plurality of first voltage sources for supplying different D.C. voltage levels to be indicated, a second voltage source for supplying a regulated D.C. voltage, a voltage divider network connected across said second voltage source, said voltage divider network comprising a plurality of series connected resistors and providing a plurality of different reference voltages at the different terminals of said resistors, a plurality of semiconductor pairs, each semiconductor of a pair connected between different ones of said voltage divider network terminals and a single terminal of one of said first sources, a first semiconductor in each pair connected so that current may flow from the associated first source to one of said voltage divider network terminals, a second semiconductor in each pair connected so that current may flow from another of said voltage divider network terminals to the associated first source, both of said semiconductors in a pair being non-conductive when the voltage level of said associated first source connected thereto is between the voltage levels applied thereto by said reference voltages, one of said semiconductors in a pair being conductive when the voltage level of said associated first source is not between the voltage levels of said voltage divider network terminals, an A.C. circuit coupled via D.C. blocking capacitors to all of said single terminals on said first sources and to all of said terminals of said voltage divider network, said A.C. circuit comprising a transistor amplifier and a small-signal, high-frequency generator, each of said semiconductors providing switch-like action in said A.C. circuit to permit or inhibit current therethrough in accordance with the conduction state of said semiconductors, and an indicating device coupled to said A.C. circuit transistor for indicating the presence or absence of current flow in said A.C. circuit.

References Cited by the Examiner

UNITED STATES PATENTS

| | | | |
|---|---|---|---|
| 2,454,807 | 11/48 | Kennedy | 328—149 |
| 2,676,286 | 4/54 | Buchner | 317—149.2 |
| 2,752,489 | 6/56 | Aigrain | 317—31 |
| 2,861,239 | 11/58 | Gilbert. | |
| 2,883,529 | 4/59 | Marantette | 328—148 |
| 2,885,551 | 5/59 | Greanias | 328—146 |
| 2,943,303 | 6/60 | Barber | 340—248 |
| 2,958,823 | 11/60 | Rabier | 340—248 |
| 2,982,887 | 5/61 | Seeley | 340—248 |
| 2,993,172 | 7/61 | Karlicek | 340—248 |
| 3,010,068 | 11/61 | Ferguson | 340—248 |
| 3,021,514 | 2/62 | Regis et al. | 340—248 |
| 3,072,895 | 1/63 | Kaufman | 340—248 |

OTHER REFERENCES

IBM Technical Disclosure Bulletin; Ramp Coincidence Detector by French, vol. 2, No. 5, February 1960; page 67.

IBM Technical Disclosure Bulletin; Voltage Detection Circuit by O'Malley; vol. 3, No. 6; November 1960; page 37.

NEIL C. READ, *Primary Examiner.*

E. JAMES SAX, *Examiner.*